Sept. 18, 1956

M. E. McDONALD 2,763,089

BALL-END FISHHOOK

Filed June 25, 1953

INVENTOR

*Marshall E. McDonald*

BY *Victor J. Evans & Co.*

ATTORNEYS

United States Patent Office 2,763,089
Patented Sept. 18, 1956

2,763,089
BALL-END FISHHOOK

Marshall E. McDonald, Babbitt, Nev.

Application June 25, 1953, Serial No. 363,977

2 Claims. (Cl. 43—44.83)

This invention relates to fishing equipment, and more particularly to a fishhook support.

The object of the invention is to provide a fishhook support which will carry or support very heavy loads, and wherein the device is easy to assemble and disassemble.

Another object of the invention is to provide a fishhook support wherein the fishhook is swivelly connected to a housing or frame and wherein the fishing line is also swivelly connected to the fishhook housing, the support being attractively constructed so that it will increase the chances of a fish striking the hook.

A further object of the invention is to provide a fishhook support which is extremely simple and inexpensive to manufacture.

Other objects and advantages will be apparent during the course of the following description.

In the accompanying drawings, forming a part of this application, and in which like numerals are used to designate like parts throughout the same:

Figure 1:
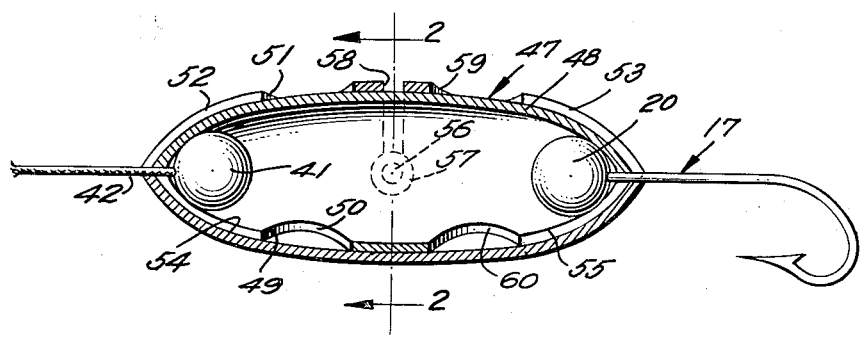
Figure 1 is a longitudinal sectional view taken through the fishhook support of the present invention which includes an inner rotatable member mounted in a housing.
Figure 2:
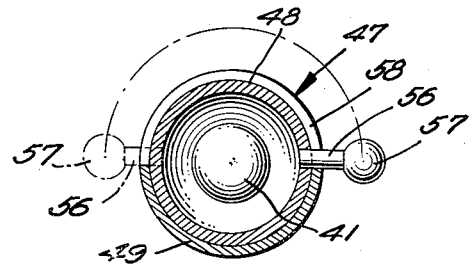
Figure 2 is a sectional view taken on line 2—2 of Figure 1.

Referring to Figures 1 and 2 of the drawings, there is shown the fishhook support which is indicated generally by the numeral 47. The support 47 includes an inner casing 48 which is rotatably mounted in an outer housing 49. The inner casing 48 is provided with a plurality of openings 50 and 60, and the outer housing is provided with openings 51 and 59, Fig. 1. The outer housing 49 is further provided with a pair of slots 52 and 53, and the inner casing 48 has slots 54 and 55. A shank 56 of a handle has its inner end secured to the rotatable inner casing 48, and a knob 57 is mounted on the outer end of the shank 56. The shank 56 is adapted to move or slide through an arcuate slot 58 in the outer housing 49. The parts are shown in their assembled operative position in Figure 1 and when it is desired to assemble the parts as shown in Figure 1, the shank 56 is moved through the slot 58 in order to rotate the inner casing 48 whereby the slot 54 will register with the slot 52 and the slot 55 will register with the slot 53. At the same time the openings 51 and 50 register and the openings permit the ball 41 to be inserted therethrough. The registering slots 54 and 52 permit the wire or fish line 42 which is secured to the ball 41 to be extended therethrough. There is also provided in the outer housing 49 an opening 59 which is adapted to register with an opening 60 in the rotatable casing 48 when the slots 53 and 55 are in registry, and the openings 59 and 60 and the slots 53 and 55 when in their registering position permit the ball member 20 and the shank of the fishhook 17 to be inserted or removed from the device. When the parts are in the position shown in Figures 1 and 2, the ball 41 and the ball 20 will be locked therein so that the fishhook or fish line cannot accidentally work loose therefrom.

From the foregoing it is apparent that a fishhook support has been provided wherein both the fishing line and fishhook are swivelly connected to the support. The parts can be made of any suitable material and the support will be extremely attractive to fishes and it is easy to assemble and disassemble when the parts are to cleaned or replaced. In Figures 1 and 2 by revolving the knob 57 the inner casing 48 can be rotated to align the slots and openings so that the parts can be assembled or disassembled. The device can be made in various sizes and of various materials, and certain of the parts may be magnetized if desired, in order to provide greater retention between the parts.

I claim:

1. In a fishhook support, an outer housing, an inner casing rotatably mounted in said housing, said casing and housing each being provided with a plurality of openings, said casing being mounted for movement so as to locate its openings into and out of registry with the openings in said housing, said casing and housing having a pair of slots, said casing being mounted for movement so as to locate its slots into and out of registry with the slots in said housing, operating means including a shank portion having its inner end secured to the rotatable inner casing, and a knob portion mounted on the outer end of said shank, said housing having an arcuate slot for the slidable projection therethrough of said shank, a ball positioned in said casing, a line extending through certain of said slots and secured to said ball, and a fishhook including a shank portion having a barb on its outer end and a ball on its inner end seated in said casing.

2. In a fishhook support, an outer housing, an inner casing rotatably mounted in said housing, said casing and housing each being provided with openings, said casing being mounted for movement so as to locate its openings into and out of registry with the openings in said housing, said casing and housing having slots, said casing being mounted for movement so as to locate its slots into and out of registry with the slots in said housing, operating means including a shank secured to the rotatable inner casing, and a knob portion mounted on said shank, said housing having a slot for the slidable projection therethrough of said shank, a ball positioned in said casing, a line extending through certain of said slots and secured to said ball, and a fishhook including a shank portion having a barb on its outer end and a ball on its inner end seated in said casing.

References Cited in the file of this patent

UNITED STATES PATENTS

| 784,942 | Henckler | Mar. 14, 1905 |
| 1,225,100 | Aubrey | May 8, 1917 |
| 1,380,244 | Otis | May 31, 1921 |
| 1,432,059 | Fullington | Oct. 17, 1922 |
| 2,051,591 | Brogan | Aug. 18, 1936 |
| 2,449,167 | Hopewell | Sept. 14, 1948 |
| 2,576,563 | Blewett | Nov. 27, 1951 |
| 2,706,359 | Beames | Apr. 19, 1955 |

FOREIGN PATENTS

| 923 | Great Britain | 1857 |